United States Patent [19]

Nattel

[11] 4,167,056

[45] Sep. 11, 1979

[54] KNOCKOUT EXTRACTING TOOL

[75] Inventor: William Nattel, Montreal, Canada

[73] Assignee: GTE Sylvania Canada Limited, Montreal, Canada

[21] Appl. No.: 900,630

[22] Filed: Apr. 27, 1978

[51] Int. Cl.$^2$ .............................................. B23P 19/04

[52] U.S. Cl. .................................. 29/267; 81/3.46 R; 225/103

[58] Field of Search ..................... 81/3 R, 3.1 R, 3.34, 81/3.46 R, 3.47, 3.48, 3.49; 29/267, 278; 254/131; 225/103; 72/458, 479; 7/169

[56] References Cited

U.S. PATENT DOCUMENTS

| | | | |
|---|---|---|---|
| 2,133,752 | 10/1938 | Myer et al. | 254/131 |
| 3,579,797 | 5/1971 | Pepe | 29/267 |
| 3,713,200 | 1/1973 | Burns | 81/3.46 R |
| 3,736,643 | 6/1973 | Pepe | 81/3.46 R |
| 3,770,873 | 11/1973 | Brown | 174/58 |
| 4,034,595 | 7/1977 | Smith | 72/458 |

*Primary Examiner*—Robert Louis Spruill
*Assistant Examiner*—Roscoe V. Parker
*Attorney, Agent, or Firm*—David M. Keay

[57] ABSTRACT

A hand tool for quickly, easily, and cleanly removing concentric knockout rings from electrical sheet metal enclosures. The tool is an elongated member fabricated of flat metal stock. Notches in opposite edges at one end of the tool are adapted to engage opposite inner edges of a knockout ring having a central opening. The tool is rocked back and forth pivoting the two halves of the knockout ring about the tabs retaining it in the sheet metal of the enclosure until the tabs fracture completely severing the knockout ring from the enclosure and providing an opening in the enclosure wall for accommodating cable or conduit.

3 Claims, 16 Drawing Figures

KNOCKOUT EXTRACTING TOOL

BACKGROUND OF THE INVENTION

This invention relates to hand tools. More particularly, it is concerned with a hand tool for removing knockout rings from electrical sheet metal enclosures.

Many sheet metal boxes or enclosures employed in electrical wiring systems have knockouts of standard sizes which may be selectively removed to permit the passage of cables or conduit. Typically the knockouts are discs which are severed from the sheet metal of the enclosure except for a tab at a small portion of the periphery. In order to permit the same knockout to be used for cables or conduits of different sizes the center knockout disc may be encircled by one or more concentric knockout rings. Typically each knockout ring is held in position in the sheet metal of the enclosure by two diametrically opposed tabs.

In the usual manner of preparing a box for a conduit of large size an electrician would first use a screwdriver to knock out the center disc of the knockout. Then a screwdriver would be used to pry loose and bend up one side of the first knockout ring encircling the opening left by removal of the center disc. This step would be repeated to pry loose and bend up the other side of the ring. Next the electrician would use a pair of pliers to twist the bent ring back and forth until it would break out by fracturing the tabs. This procedure was time consuming and required a certain amount of manual dexterity. Frequently the ring would break leaving a portion of a tab attached to the enclosure which would have to be removed in order for the conduit to fit in the opening.

SUMMARY OF THE INVENTION

In accordance with the present invention a simple inexpensive tool is provided for removing concentric knockout rings easily, quickly, and cleanly. The tool includes an elongated member having a first notch in one face adjacent to one end for engaging a knockout ring at a point along its inner edge. The elongated member also has a second notch adjacent to the one end in the opposite face for engaging the knockout ring at another point along its inner edge. The portion of the elongated member between the first and second notches is dimensioned so as to permit that portion to fit within a diameter of the opening in the ring with the first notch engaging the knockout ring at one point and with the second notch aligned with the knockout ring at another point diametrically opposite the one point. When the elongated member is displaced laterally from along a diameter of the opening, both the first and second notches engage the knockout ring. The knockout ring may then be removed from the sheet metal by pivoting the elongated member back and forth generally along the direction of a line between the points of engagement of the notches with the knockout ring.

For a better understanding of the present invention, together with other and different objects, advantages, and capabilities thereof, reference is made to the following disclosure and appended claims in connection with the abovedescribed drawings.

DETAILED DESCRIPTION OF THE INVENTION

Figure 1:
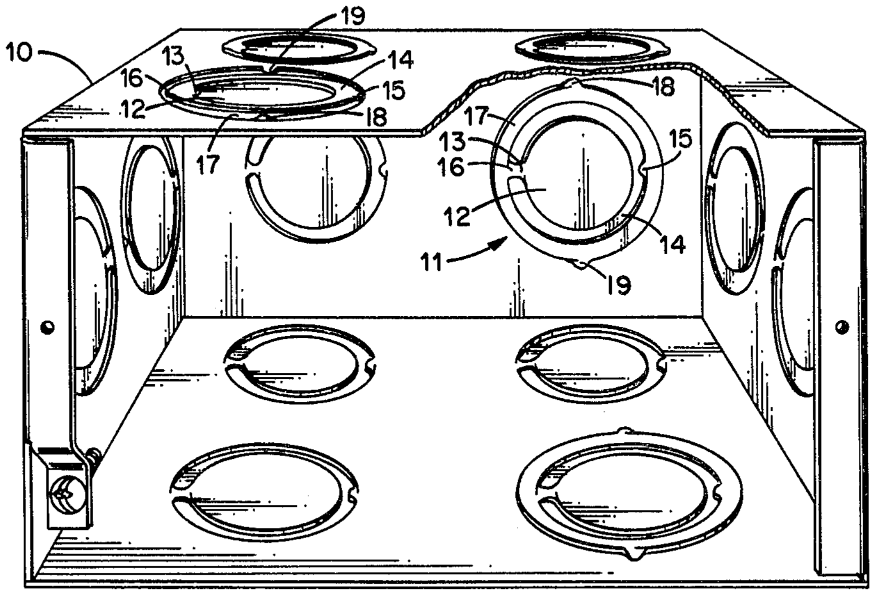
FIG. 1 is a perspective view of an electrical sheet metal box having several knockouts for receiving electrical conduits of different standard sizes.

FIG. 1 is a perspective view illustrating a sheet metal electrical wiring box 10 which is exemplary of enclosures widely used in electrical wiring systems. The walls of the box contain knockouts 11 which may be selectively removed to provide openings through the walls for the entrance of electrical conduits. For example, in the box 10 as illustrated knockouts are provided for accommodating conduits of nominal $\frac{1}{2}$", $\frac{3}{4}$", and 1" sizes. An opening for receiving a $\frac{1}{2}$" conduit may be provided by removing a knockout disc 12. As is well-known the disc is formed during manufacture of the box by severing the sheet metal defining the periphery of the disc except for a tab 13. Encircling the disc 12 is a first concentric knockout ring 14 which is held in place by two diametrically opposed tabs 15 and 16. Removal of the knockout disc 12 and the knockout ring 14 provides an opening to accommodate a nominal $\frac{3}{4}$" conduit. As shown in FIG. 1 certain of the knockouts include a second concentric ring 17 which may removed to accommodate a nominal 1" conduit. The second knockout ring 17 is held in the sheet metal of the enclosure by two diametrically opposite tabs 18 and 19 at 90° to tabs 15 and 16 holding the first knockout ring 14.

Figure 2:
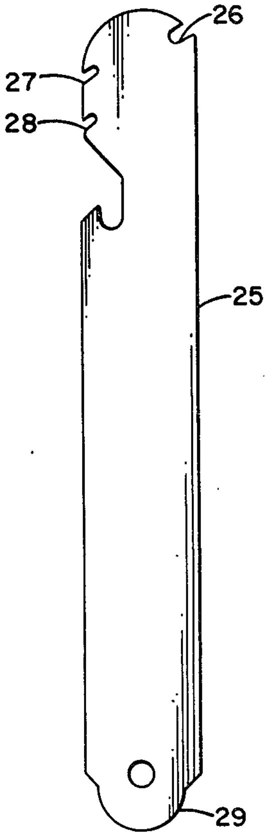
FIG. 2 is a plan view of a knockout extracting tool in accordance with the present invention.

FIG. 2 is a plan view of a knockout extracting tool 25 in accordance with the present invention for removing knockouts as shown in FIG. 1. The tool 25 is an elongated member having generally parallel edges and is fabricated from flat metal stock. Adjacent to one end of the tool is a first notch 26 in one edge. In the opposite edge of the tool is a second notch 27. As will be explained in detail hereinbelow notches 26 and 27 operate to engage opposite portions of the inner edge of a first knockout ring 14 after an opening has been formed in the center of the ring.

The tool also has a third notch 28 in the edge adjacent to the second notch 27. The third notch 28 is used in combination with the first notch 26 to engage opposite portions of the inner edge of a second knockout ring 17 of larger diameter than the first. A portion 29 of the opposite end of the tool is of appropriate size to use for knocking out central knockout discs 12. The portion of the tool between the two ends serves as a handle. Other details of the knockout extracting tool shown in FIG. 2 will be described together with the manner of its operation in removing knockouts.

Figure 3A:
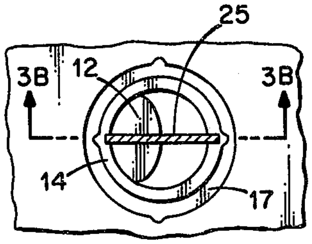
FIGS. 3A and 3B are plan and cross-sectional views, respectively, illustrating the tool of FIG. 2 being employed to remove a center knockout disc from the box of FIG. 1.
Figure 3B:
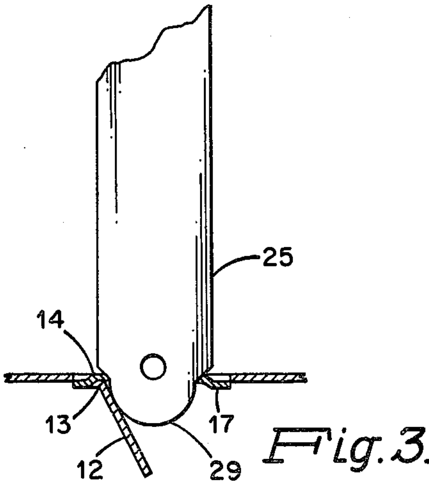

FIGS. 3A and 3B illustrate the tool 25 being employed to dislodge the central knockout disc 12 from a knockout 11. The end 29 of the tool is forced or hammered against the disc causing the disc to pivot downward about the tab 13. Either the action of forcing the disc downward as shown in FIGS. 3A and 3B, or slight rocking of the tool, or, if necessary, the use of pliers easily removes the disc 12 leaving an opening in the wall suitable for accommodating ½" conduit.

Figure 4A:
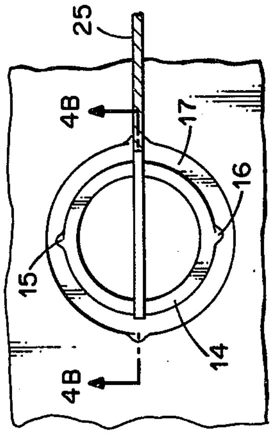
FIGS. 4A and 4B, 5A and 5B, and 6A and 6B are plan and cross-sectional views illustrating steps in the removal of a knockout ring from the box of FIG. 1.
Figure 4B:
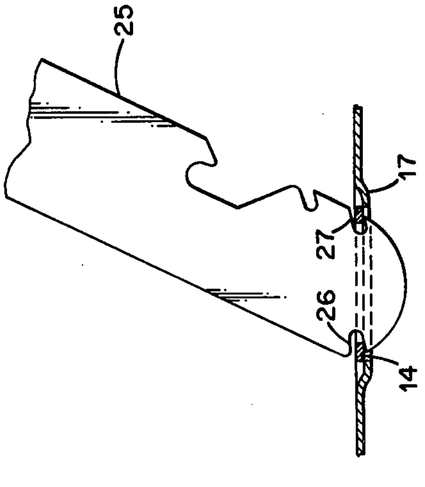

FIGS. 4A and 4B, 5A and 5B, and 6A and 6B illustrate steps in the removal of the first concentric knockout ring 14 to provide an opening for ¾" conduit. As illustrated in FIGS. 4A and 4B the end of the tool containing the notches is placed in the opening formed by removal of the disc 12 with the first notch 26 engaging the inner edge of the knockout ring 14. The tool is then pivoted downward as shown in FIG. 4B with the second notch 27 aligned with the opposite edge of the ring 14 to a point diametrically opposite the first notch 26. The flat surfaces of the tool are approximately perpendicular to the surface of the box containing the knockout and lie approximately 90° from a line between the retaining tabs 15 and 16. The configuration of the portion of the end of the tool lying between the first and second notches 26 and 27 is such as to permit that portion of the tool to be positioned in the opening with the notches 26 and 27 properly aligned with the diametrically opposite edges of the ring 14.

Figure 5A:
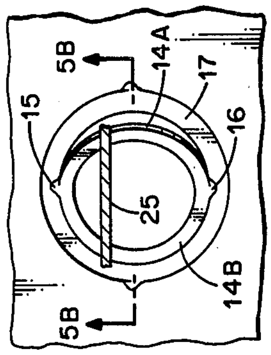
Figure 5B:
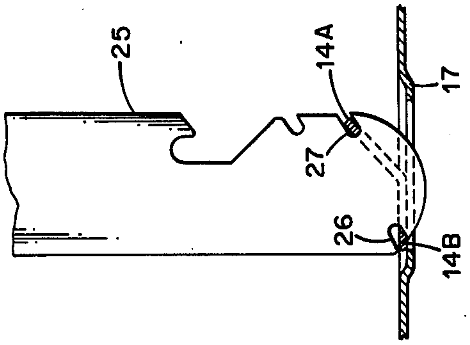
Figure 6A:
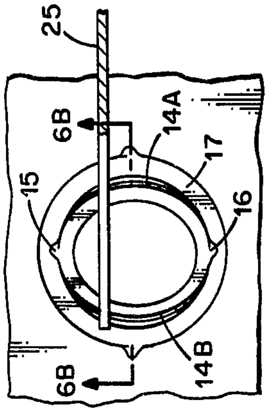
Figure 6B:
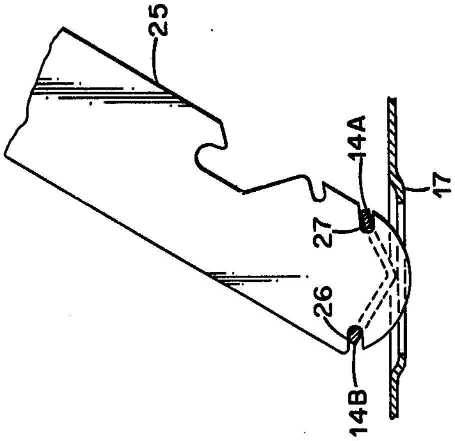

The tool 25 is then shifted laterally from the diameter of the opening as shown in FIG. 5A so that both notches 26 and 27 engage the knockout ring 14. Next the tool is pivoted in one direction as shown in FIG. 5B about the tabs 15 and 16. As shown in FIG. 5B and in FIG. 5A, this action causes one half of the ring 14A to be lifted upward. As illustrated in FIGS. 6A and 6B the tool is then pivoted in the opposite direction about the tabs 15 and 16 causing the other half of the ring 14B to be raised while the first half 14A is lowered. The tool is rocked back and forth about the tabs 15 and 16 until they are fatigued sufficiently to fracture thereby separating the knockout ring 14 from the sheet metal of the enclosure. The ring is removed from the tool by twisting approximately 90° with respect to the tool, and is then discarded. The resulting opening in the wall has a clean surface free of burrs and ready to accommodate ¾" conduit.

Figure 7A:
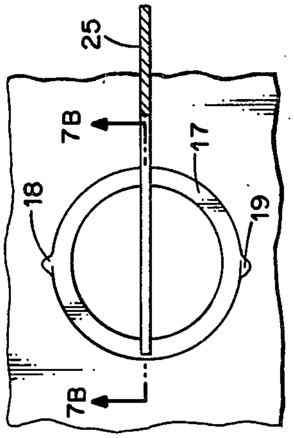
FIGS. 7A and 7B, 8A and 8B, and 9A and 9B are plan and cross-sectional views illustrating steps in the removal of a second concentric knockout ring from the sheet metal box of FIG. 1.
Figure 7B:
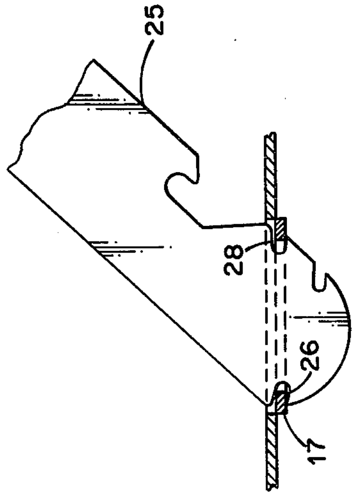
Figure 8A:
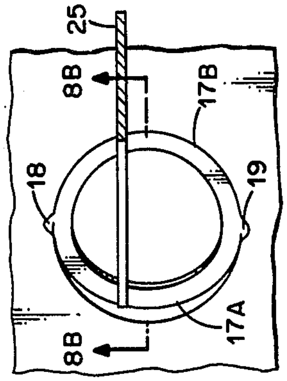
Figure 8B:
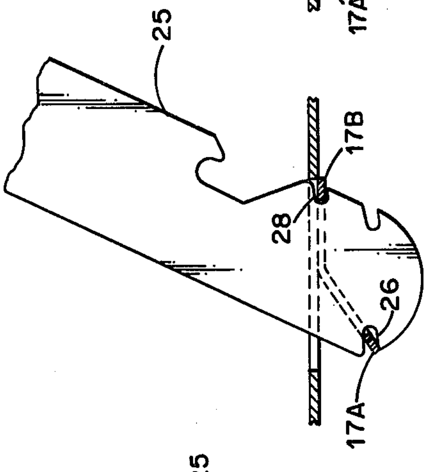
Figure 9A:
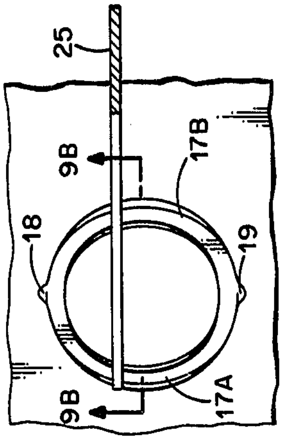
Figure 9B:
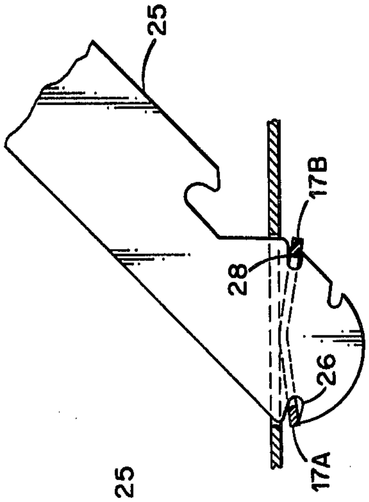

FIGS. 7A and 7B, 8A and 8B, and 9A and 9B illustrate similar steps in removing the second concentric knockout ring 17 in order to accommodate a 1" conduit. As shown in FIGS. 7A and 7B the tool 25 is inserted in the opening formed by removal of the disc 12 and the first knockout ring 14 with the first notch 26 engaging the inner edge of the ring 17 at a point approximately 90° from the retaining tabs 18 and 19. The tool 25 is positioned along a diameter of the opening with the third notch 28 and first notch 26 aligned with the edges of the knockout ring 17. The configuration of the portion of the end of the tool between the first and third notches permits that portion to fit within the diameter of the opening for proper positioning of the notches as shown in FIG. 7B. The tool is then shifted laterally off the diameter, as illustrated in FIG. 8A, so that the notches 26 and 28 both fully engage the knockout ring 17. The tool 25 is then pivoted upwardly as shown in FIG. 8B about the tabs 18 and 19 causing one half of the ring 17A to bend downwardly as shown in FIG. 8B. As shown in FIGS. 9A and 9B the direction of pivoting is reversed causing the other half 17B of the knockout ring to be pivoted downward about the tabs 18 and 19 while lifting the first half 17A of the ring. The tool is rocked backward and forward pivoting about the tabs 18 and 19 and fatiguing the metal at the tabs until they break cleanly, completely severing the second knockout ring 17 from the box. The deformed knockout ring is then removed from the tool and discarded as explained previously. Thus an opening having clean edge surfaces free of burrs suitable for accommodating 1" conduit is quickly and easily obtained.

The specific embodiment of the knockout extracting tool in accordance with the invention as shown and described has one notch in one edge and two notches in the opposite edge to permit the tool to be used to extract knockout rings for ¾" and 1" conduit. By the addition of one or more notches in either or both edges of the tool, the tool could be used to extract knockout rings of other sizes.

While there has been shown and described what is considered a preferred embodiment of the present invention, it will be obvious to those skilled in the art that various changes and modifications may be made therein without departing from the invention as defined by the appended claims.

What is claimed is:

1. A tool for extracting a first knockout ring of predetermined dimensions from sheet metal wherein the first knockout ring encircles an opening of predetermined diameter in the sheet metal and for extracting a second knockout ring of predetermined dimensions from sheet metal wherein the second knockout ring encircles a second opening of predetermined diameter larger than the diameter of the first mentioned opening, the tool including an elongated member;

a first notch in one face of the elongated member adjacent to one end thereof for engaging the first knockout ring at a point along the inner edge of the first knockout ring;

a second notch in the opposite face of the elongated member adjacent to said one end thereof for engaging the first knockout ring at another point along the inner edge of the first knockout ring;

the portion of the elongated member between the first and second notches having dimensions permitting the portion to fit within a diameter of the opening with the first notch engaging the first knockout ring at one point and with the second notch aligned with the first knockout ring at another point diametrically opposite the one point;

the first and second notches both engaging the first knockout ring when the elongated member is displaced laterally from a diameter of the opening;

whereby the first knockout ring may be removed from the sheet metal by pivoting the elongated member back and forth generally along the direction of a line between the points of engagement of the notches with the first knockout ring;

a third notch in said opposite face of the elongated member adjacent to said second notch;

the portion of the elongated member between the first and third notches having dimensions permitting the portion to fit within a diameter of the second opening with the first notch engaging the second knockout ring at one point and with the third notch aligned with the second knockout ring at another point diametrically opposite the one point;

the first and third notches both engaging the second knockout ring when the elongated member is displaced laterally from a diameter of the second opening;

whereby the second knockout ring may be removed from the sheet metal by pivoting the elongated member back and forth generally along the direction of a line between the points of engagement of the first and third notches with the second knockout ring.

2. A tool in accordance with claim 1 wherein the elongated member is fabricated of flat metal and has generally parallel edges in the region of said one end;

said first notch is in one edge of the member adjacent to the one end thereof;

said second notch is in the opposite edge of the member adjacent to the one end thereof; and said third notch is in the opposite edge of the member adjacent to the second notch, the spacing between the first and third notches being greater than the spacing between the first and second notches.

3. A tool in accordance with claim 2 wherein the end of the elongated member opposite said one end includes a portion dimensioned to fit within a diameter of said first-mentioned opening for removing a knockout disc closing said first-mentioned opening by forcing said portion at the opposite end of the elongated member against the knockout disc and into the opening; and the region of the elongated member between said one end and said opposite end providing a handle for gripping the elongated member.

* * * * *